(12) United States Patent
Mori et al.

(10) Patent No.: US 9,510,707 B2
(45) Date of Patent: Dec. 6, 2016

(54) VIBRATION PROOF WATER TANK OF A BEVERAGE MACHINE

(75) Inventors: Peter Mori, Walperswil (CH); Gilles Gavillet, Ursy (CH)

(73) Assignee: Nestec S.A., Vevey (CH)

( * ) Notice: Subject to any disclaimer, the term of this patent is extended or adjusted under 35 U.S.C. 154(b) by 1204 days.

(21) Appl. No.: 13/518,312

(22) PCT Filed: Jan. 3, 2011

(86) PCT No.: PCT/EP2011/050022
§ 371 (c)(1),
(2), (4) Date: Jun. 21, 2012

(87) PCT Pub. No.: WO2011/083103
PCT Pub. Date: Jul. 14, 2011

(65) Prior Publication Data
US 2013/0014647 A1    Jan. 17, 2013

(30) Foreign Application Priority Data
Jan. 6, 2010  (EP) .................................... 10150157

(51) Int. Cl.
*A47J 31/00*    (2006.01)
*A47J 31/44*    (2006.01)

(52) U.S. Cl.
CPC ................. *A47J 31/4403* (2013.01)

(58) Field of Classification Search
CPC .................................................. A47J 31/4403
USPC ................. 99/279, 295, 285, 286, 307, 287, 304,99/306, 300, 288, 293, 303, 310, 313
See application file for complete search history.

(56) References Cited

U.S. PATENT DOCUMENTS

| | | | |
|---|---|---|---|
| 4,793,245 A | 12/1988 | Kimura | |
| 4,882,983 A * | 11/1989 | Pastrick | A47J 31/0615 99/295 |
| 5,473,972 A | 12/1995 | Rizzuto et al. | |
| 5,628,239 A | 5/1997 | Wu | |
| 6,227,102 B1 * | 5/2001 | Sham et al. | A47J 31/42 99/286 |
| 6,405,637 B1 | 6/2002 | Cai | |
| 2005/0268790 A1 * | 12/2005 | Baldacci | A47J 31/4496 99/285 |

(Continued)

FOREIGN PATENT DOCUMENTS

| | | |
|---|---|---|
| EP | 0676162 | 10/1995 |
| EP | 1867259 A1 | 12/2007 |

(Continued)

OTHER PUBLICATIONS

International Search Report and Written Opinion issued Jul. 12, 2011 for related Intl. Appln. No. PCT/EP2011/050022.

*Primary Examiner* — Phuong Nguyen
(74) *Attorney, Agent, or Firm* — K&L Gates LLP

(57) ABSTRACT

A beverage preparation machine (1) comprises: a beverage preparation module (2) that vibrates during use, in particular a module for preparing a beverage by circulating a liquid via a flavoring ingredient such a pre-portioned ingredient contained in a capsule; and a reservoir (4) for storing liquid and supplying such liquid to the beverage preparation module. The beverage preparation module and the reservoir are connected by a vibration-barrier mechanical connection (3, 45, 291, 431) for inhibiting or preventing propagation of vibrations from the beverage preparation module to the reservoir.

16 Claims, 2 Drawing Sheets

(56) References Cited

U.S. PATENT DOCUMENTS

2006/0090653 A1     5/2006   McDuffie et al.

FOREIGN PATENT DOCUMENTS

| EP | 2095749 | 9/2009 |
|----|---------|--------|
| FR | 2640864 A1 | 6/1990 |
| JP | 0621529 | 3/1994 |
| WO | 01/72189 A1 | 10/2001 |
| WO | 2005/107542 A1 | 11/2005 |
| WO | 2009074559 | 6/2009 |

* cited by examiner

VIBRATION PROOF WATER TANK OF A BEVERAGE MACHINE

CROSS REFERENCE TO RELATED APPLICATIONS

The present application is a National Stage of International Application No. PCT/EP2011/050022, filed on Jan. 3, 2011, which claims priority to European Patent Application No. 10150157.5, filed on Jan. 6, 2010, the entire contents of which are being incorporated herein by reference.

FIELD OF THE INVENTION

The present invention concerns the noise and/or nuisance reduction of a beverage preparation machine with a liquid reservoir, in particular a machine comprising a pump for circulating the liquid.

For the purpose of the present description, a "beverage" is meant to include any liquid food, such as tea, coffee, hot or cold chocolate, milk, soup, baby food, etc. . . . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir.

Suitable pumps for beverage machines are for instance disclosed in U.S. Pat. Nos. 2,715,868, 5,392,694, 5,992,298, 6,554,588, WO 2006/032599, WO 2009/024500, WO 2009/150030 and PCT/EP09/058562.

One problem of such beverage preparation machines relate to the vibrations generated during use, e.g. by a pump that circulates the water through the beverage preparation machine. Such vibrations tend to propagate throughout the beverage preparation machine and may generate unpleasant noises. To reduce the nuisance caused by such vibrating machines, it is known to use a resilient mount for the pump in the machine, as disclosed in the abovementioned prior art, and to apply resilient feet underneath the machine so that the vibrations are dampened in the machine and less propagated to the surface on which the machine stands during use. It is also known to reduce the nuisance generated by the pump by controlling appropriately the powering of the pump during the beverage preparation process, as disclosed in the above cited prior art.

There is still a need to reduce the noise and the nuisance generated by a beverage preparation machine containing components that vibrate during use.

SUMMARY OF THE INVENTION

A preferred object of the present invention is to reduce the noise and/or nuisance generated by beverage preparation machines that have one or more components that vibrate during use, in particular a vibrating pump such as a reciprocating piston pump.

Therefore, the invention relates to a beverage preparation machine that includes:

a beverage preparation module that vibrates during use, in particular a module for preparing a beverage by circulating a liquid via a flavouring ingredient such a pre-portioned ingredient contained in a capsule; and a reservoir for storing and supplying liquid to the beverage preparation module.

The beverage preparation module may include a pump that vibrates during use, in particular a pump for circulating liquid from the reservoir to a beverage outlet of the beverage preparation module. The pump may be a reciprocating piston pump or a rotary pump.

For instance, the machine is a coffee, tea, chocolate or soup preparation machine, such as a self-contained table-top machine that can be electrically connected to the mains, e.g. at home or in an office. In particular, the machine is arranged for preparing within the ingredient processing arrangement a beverage by passing hot or cold water or another liquid through a capsule containing an ingredient of the beverage to be prepared, such as ground coffee or tea or chocolate or cacao or milk powder.

For example, the preparation machine comprises: an ingredient processing arrangement including one or more of a liquid reservoir, liquid circulation circuit, a heater, a pump and a beverage preparation unit arranged to receive ingredient capsules for extraction and evacuate capsules upon extraction; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550, WO 2009/130099 and PCT/EP09/053139.

The beverage preparation module may include one or more of the following components:
a) a brewing unit for receiving an ingredient of this beverage, in particular a pre-portioned ingredient supplied within a capsule, and for guiding an incoming flow of liquid, such as water, through said ingredient to a beverage outlet;
b) an in-line heater, such as a thermoblock, for heating this flow of liquid to be supplied to the brewing unit;
c) a pump for pumping this liquid through the in-line heater;
d) one or more fluid connecting members for guiding this liquid from a source of liquid, such as a tank of liquid, to the beverage outlet;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151.

In accordance with the invention, the beverage preparation module and the reservoir are connected by a vibration-barrier mechanical connection for inhibiting or preventing propagation of vibrations from the beverage preparation module to the reservoir.

Hence, the operative configuration of the machine, e.g. standing on top of a table or a shelf or in or on a cupboard or like support, in particular a generally flat and horizontal support, is such as to avoid any vibration-propagating rigid connection between the vibrating beverage preparation module and the liquid reservoir during use. In particular, the machine comprises no rigid chassis or base that extends from the vibrating module to the reservoir and that communicates such vibrations to the reservoir. Moreover, the machine has no rigid fastening means securing the reservoir to the beverage preparation module capable to communicate vibrations to the reservoir during use.

Hence, the liquid reservoir, e.g. a water tank, is generally shielded from vibrations caused by the beverage preparation module. It follows that the reservoir is inhibited from transmitting or reinforcing vibrations and related noise. Overall noise and vibration level of the beverage preparation machine is thus reduced.

The liquid reservoir can be designed such that it stands independently of the beverage preparation module on a support during use. The interface between the liquid reservoir and the beverage preparation module may be elastic, e.g. made of silicone, to avoid propagation of vibrations from the module to the reservoir.

Typically, the vibration-barrier mechanical connection has a fluid circulation line extending from the beverage preparation module to the reservoir and has a resilient section preventing or inhibiting propagation of vibrations from the beverage preparation module to the reservoir via the fluid circulation line. The reservoir can be disconnectable from the beverage preparation module at the resilient section.

The beverage preparation module may have a fluid connector with a liquid inlet and the reservoir can have a fluid connector with a liquid outlet, the connectors of the module and the reservoir being disconnectably connectable to bring the reservoir in fluid communication with the module. For instance, the fluid connector of the module forms a docking station for the reservoir. The docking station is in particular arranged to support the reservoir when the module is lifted or moved with the reservoir.

The fluid connector of the module may contact the reservoir via a resilient interface, in particular formed by an elastic member e.g. ring-shaped, that prevents or inhibits propagation of vibrations from the beverage preparation module to the reservoir via the fluid circulation line.

In an embodiment, the reservoir has a foot arranged to rest during use on an external support, in particular distinct form the beverage preparation machine, such as a table top, that is unsecured to the beverage preparation module. The beverage preparation module typically has a bottom, in particular having one or more vibration-dampeners such as rubber feet and/or bumpers, that is arranged to rest on such an external support during use. Hence, the weight of the reservoir does not rest on the beverage preparation module and is not vibrated thereby during use.

The beverage preparation machine normally comprises a connecting arrangement between the reservoir and the beverage preparation module, in particular a fastening arrangement such as a hook and hook-retainer arrangement. This connecting arrangement may be used to: position the reservoir relatively to the beverage preparation module during use; and/or suspend and/or secure the reservoir to the beverage preparation module when the module is lifted or moved. Such connecting arrangement is configured to prevent or inhibit propagation of vibrations from the beverage preparation module to the reservoir during use.

This connecting arrangement may comprise an arrangement articulated relative to the reservoir and/or beverage preparation module and so movable to prevent propagation of vibrations from the beverage preparation module to the reservoir. This connecting arrangement can include an arrangement fixed to the reservoir and/or beverage preparation module that is configured to: allow free movements of the beverage preparation module relative to the reservoir during use; and secure the reservoir to the beverage preparation module when the module is moved. Hence, in the operative configuration, the connecting arrangement does not rigidly connect the beverage preparation module to the reservoir and inhibits or prevents propagation of vibrations from the module to the reservoir.

The beverage preparation module is typically contained in an outermost housing with at least one upright wall, such as a rear wall opposite a beverage front outlet or a sidewall adjacent a beverage front outlet, the reservoir being located adjacent said upright wall. The outermost housing and the reservoir, in particular an upper part of the reservoir, may have an interlocking arrangement for securing the reservoir to the housing when the beverage preparation module is displaced and allow free relative movements of the beverage module relative to the reservoir during use.

BRIEF DESCRIPTION OF THE DRAWINGS

The invention will now be described with reference to the schematic drawings, wherein.

DETAILED DESCRIPTION

FIGS. 1 to 5 illustrate an embodiment of a beverage preparation machine 1 and parts thereof according to the invention, in particular a machine for preparing a beverage by circulating a liquid via a flavouring ingredient, e.g. tea or ground coffee, such as a pre-portioned ingredient contained in a capsule. Machine 1 is shown standing on an upper surface of a table 1'. Machine 1 is electrically powered and connected to the mains via an electric cord 35.

Machine 1 includes a beverage preparation module 2 that vibrates during use; and a reservoir 4 for storing and supplying liquid, such as water, to the beverage preparation module.

Figure 1:
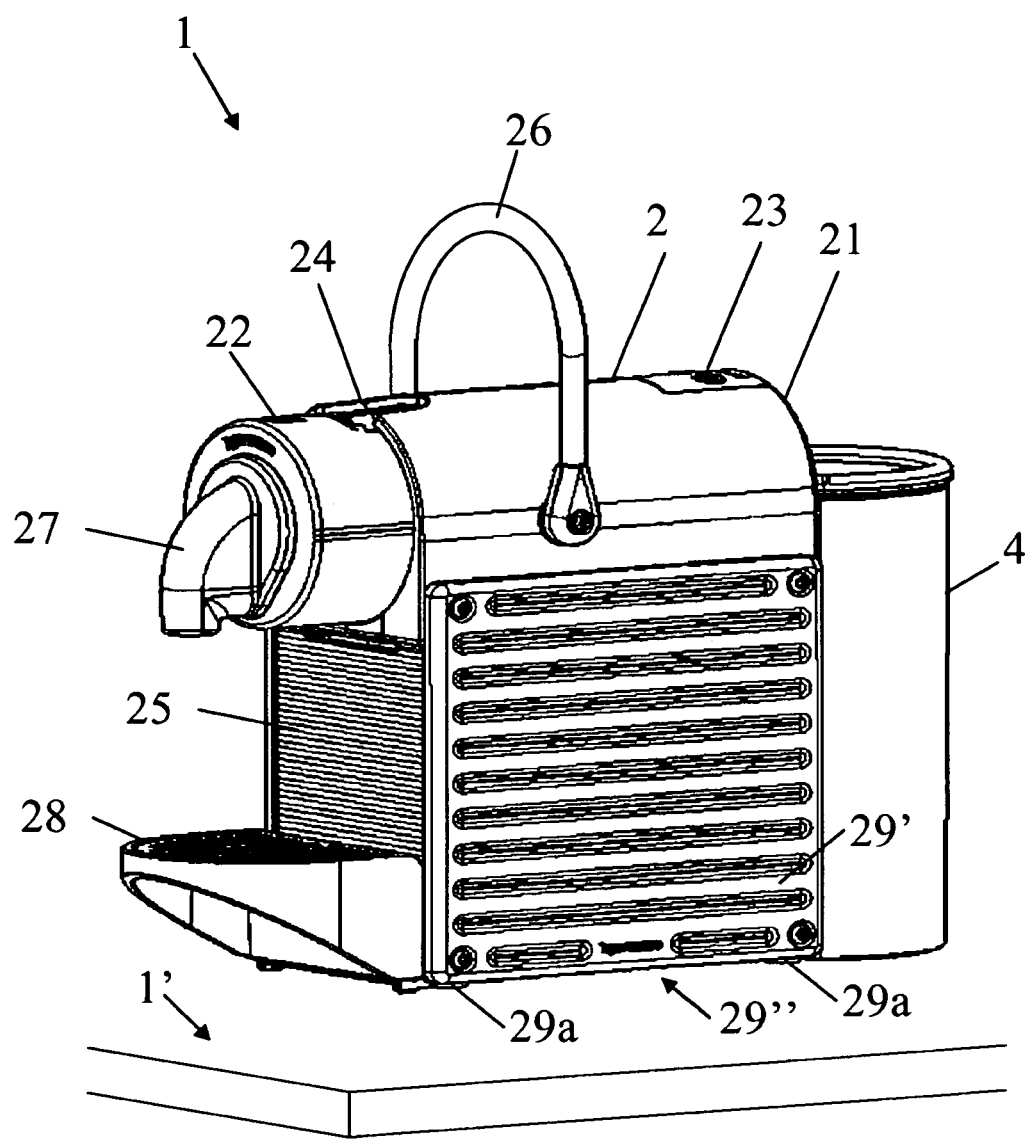
FIG. 1 is a perspective overall view a beverage preparation module and a reservoir of a beverage preparation machine according to the invention.

Module 2 has a housing 21 that contains the module's functional units, such as a fluid circuit with a pump and a heater, a brewing unit 22, and a control unit connected to a user-interface 23 including for example push-buttons. The front part of brewing unit 22 may be configured to telescope into and out of housing 21 from a capsule loading/unloading open position to a capsule extraction closed position. In the loading/unloading position, as illustrated in FIG. 1, ingredient capsules can be introduced into brewing unit 22 via capsule inlet 24 and evacuated from brewing unit 22 into a collector 25 for used capsules. A user-operable handle 26 is provided to move brewing unit 22 from the open to the closed position, i.e. to telescope the brewing unit's front part into and out of housing 21.

Furthermore, front part of brewing unit 22 leads to a beverage outlet 27 that is located above a cup support 28. Cup support 28 may be connected to a drip tray underneath used capsule collector 25 so that collector 25, cup support 28 and drip tray may be removed from and inserted into housing 21 as a unit. Cup support 28 may be pivotally mounted so as to be pivotable between a horizontal configuration, as shown in FIG. 1, for supporting small cups underneath outlet 27, and an upright configuration (not shown) to give way for placing large cups underneath outlet 27. Such pivotable cup supports and variations are disclosed in greater details in EP 1 867 260, the content of which is hereby incorporated by way of reference.

A beverage preparation machine of this type is described in greater details in WO 2009/043630 and in PCT/EP09/053139.

Figure 2:
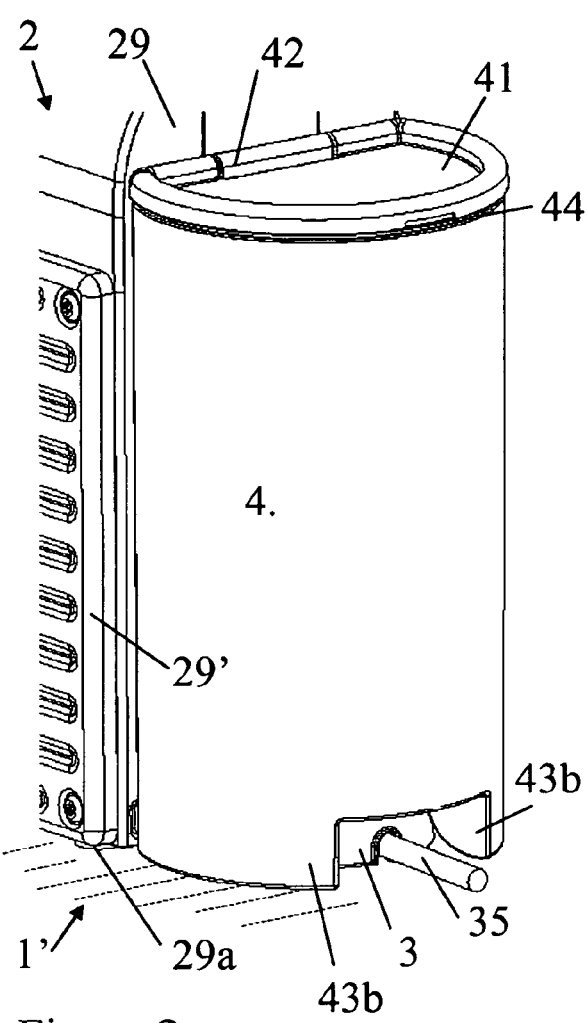
FIG. 2 is a perspective view of the reservoir associated to the beverage preparation module of the beverage preparation machine of FIG. 1.
Figure 3:
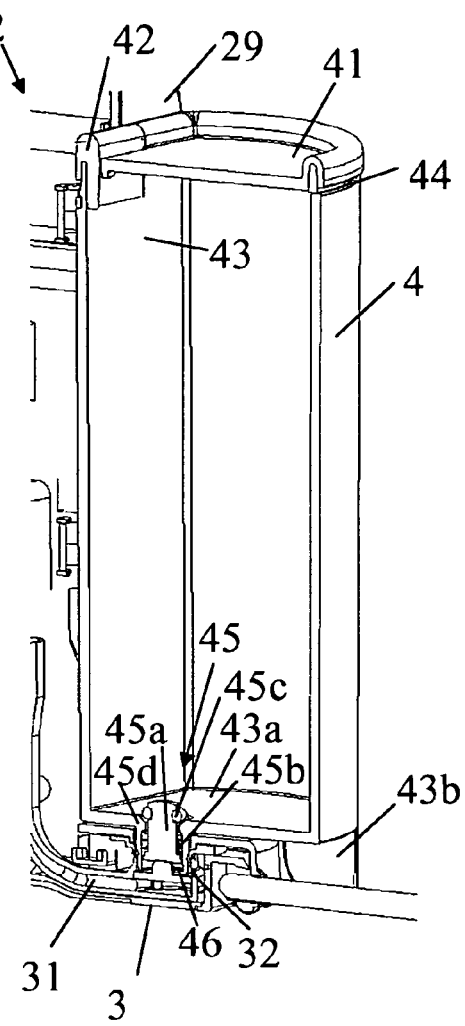
FIG. 3 is a cross-sectional perspective view of the reservoir and associated beverage preparation module shown in FIG. 2.

Reservoir 4 is arranged to store water or possibly another liquid, in particular a service liquid for a maintenance process, and is located adjacent housing 21, in particular adjacent an upright wall 29 of housing 21. As illustrated in FIGS. 1 to 3, upright wall 29 is a rear wall opposite beverage outlet 27. In a variation, the liquid reservoir may be located adjacent a sidewall of the module's housing, e.g. side panel 29'.

Reservoir 4 has a lid 41 that is pivotally mounted by a hinge 42 on upright reservoir wall 43. Rear wall 29 of module 2 faces reservoir wall 43. Moreover, lid 41 rests on rim 44 of reservoir 4.

In accordance with the invention, beverage preparation module 2 and reservoir 4 are connected by a vibration-barrier mechanical connection 3,45,291,431 for inhibiting or preventing propagation of vibrations from module 2 to the reservoir 4. Thus, the vibration-barrier mechanical connection prevents propagation of vibrations through the connection or at least significantly inhibits such propagation and shields reservoir 4 from these vibrations.

This vibration-barrier mechanical connection comprises a first connection 3,45 associated with a fluid circulation line 31,46 that extends from beverage preparation module 2 to reservoir 4 and that comprises a dampening resilient section 32, e.g. made of rubber or silicon, preventing or inhibiting propagation of vibrations from beverage preparation module 2 to the reservoir 4 via fluid circulation line 31,46.

Figure 4:
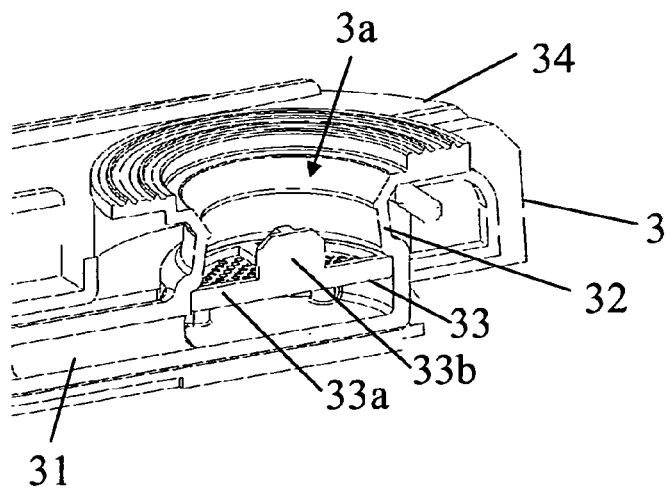
FIG. 4 is a cross-sectional perspective view of a module's docking station for the reservoir shown in FIGS. 1 to 3.

As illustrated in greater details in FIGS. 3 and 4, first mechanical connection 3,45 comprises: a docking station 3 with a liquid inlet 3a extending from beverage preparation module 2; and an outlet arrangement 45 extending from reservoir 4, in particular from a bottom 43a thereof. Outlet arrangement 45 includes a valve 45a-45d with a vertically displaceable plug 45a that is urged in its closed position (when reservoir 4 is disconnected from docking station 3) by a spring 45b, e.g. a helicoidal spring extending axially around plug 45a. To seal off outlet 45, plug 45a bears a seal 45c, in particular an o-ring type seal, that is urged under the effect of spring 45b against peripheral walls 45d of outlet 45. Inlet 3a is associated with a counter-plug 33 mounted in resilient section 32 of fluid line 31. Counter-plug 33 has a perforated base 33a acting as a filter and an upright member 33b for cooperation with plug 45a.

When reservoir 4 is mounted onto docking station 3 and outlet arrangement 45 connected to inlet 3a and disconnectable therefrom, counter-plug 33 with upright member 33b forces upwardly plug 45a which spaces seal 45c from walls 45d to form a passage for liquid to flow from a bottom part of reservoir 4 by outlet 45 and inlet 3a through filter base 33a along fluid line 31,46.

Reservoir 4 has a foot 43b that rests on an external support surface 1', e.g. on a table or a shelf, and that spaces bottom 43a of reservoir 4 above a top 34 of docking station 3. In its use configuration, i.e. in the normal configuration for operating the beverage preparation machine to prepare a beverage, bottom 43a may be spaced by a small distance above top 34, i.e. by a distance sufficient to prevent contact between top 34 and bottom 43a when docking station is vibrating with beverage preparation module 2 during use, e.g. by a distance in the range of 0.5 to 2, 3 or 5 mm.

Hence, during use, reservoir 4 contacts docking station 3 only via inlet 3a and outlet 45. Specifically, resilient section 32 of inlet 3a surrounds a bottom part of peripheral wall 45d of outlet 45 and counter plug 33 mounted in peripheral section 32 is urged against plug 45a mounted on spring 45b of outlet 45. It follows that reservoir 4 contacts beverage preparation module 2 via docking station 3 only through resiliently deformable parts which prevent or inhibit propagation of vibrations from beverage preparation module 2 to the reservoir 4. In particular, reservoir 4 includes a contact to beverage preparation module 2 via fluid circulation line 31,46 which has a resiliently deformable portion to prevent or inhibit propagation of such vibrations. Other vibration-barrier contacts may be provided between preparation module 2 and reservoir 4, in particular for stabilisation/positioning purposes.

When beverage preparation module 2 with docking station 3 is lifted, e.g. to move beverage preparation machine 1, top 34 comes into contact with bottom 43a and lifts reservoir 4, whereby foot 43b looses contact with external surface 1'. Hence, docking station 3 can be used to support reservoir 4 when beverage preparation machine 1 is lifted and moved.

In the particular embodiment shown in FIGS. 1 to 5, electric cord 35 is connected to machine 1, in particular to beverage preparation module 2 of machine 1, via docking station 3 and extends underneath reservoir 4 adjacent foot 43b to the mains. However, the electric connection of the beverage preparation machine may be provided at other locations of the machine. When beverage preparation machine 1 is lifted, cord 35 extending from docking station 3 underneath reservoir 4 does not interfere with reservoir 4.

In order to inhibit propagation of vibrations to external support surface 1', in particular to reservoir 4 via support surface 1', beverage preparation module 2 has a bottom 29" with vibration-dampeners 29a, such as rubber feet and/or bumpers, arranged to rest on external support surface 1' during use.

Figure 5:
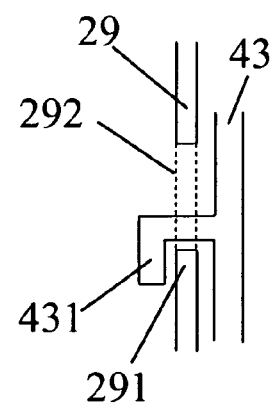
FIG. 5 schematically illustrates a mechanical connecting arrangement between a beverage preparation module and a reservoir of a beverage preparation machine.

Furthermore, as schematically illustrated in cross-section in FIG. 5, beverage preparation module 2 and reservoir 4 are connected via a second vibration-barrier connection 291, 431. Wall 43 of reservoir 4 has an outwardly projecting hook member 431, e.g. integral or assembled to wall 43, cooperating with a hook-retainer portion 291 of module's wall 29 adjacent to wall 43. Module's wall 29 has an opening 292, indicated in dotted lines, for allowing the passage of hook member 431. Portion 291 of wall 29 underneath and adjacent to opening 292 forms a hook-retainer arrangement in module 2.

Hence, beverage machine 1 has a connecting arrangement 291,431 between reservoir 4 and beverage preparation module 2 for fastening these two parts together.

During normal operation, namely when machine 1 stands on external support surface 1', hook 431 and wall 29 with hook-retainer 291 are not touching each other so that no vibrations from beverage preparation module 2 can propagate via wall 29 and hook 431 to reservoir 4. In this case, hook 431 and hook-retainer 291 are used as a guide for properly mounting and positioning reservoir 4 onto docking station 3 and to prevent that reservoir 4 gets unwantedly disconnected from station 3, e.g. if external support surface 1' and/or beverage machine 1 is/are mistakenly shaken.

When beverage preparation module 2 is lifted, foot 43b is not any more supported by external support surface 1' and does not space apart bottom 43a over docking station 3, bottom 43a being allowed to be supported by upper surface 34 of docking station 3. Moreover, hook-retainer 291 slides up relatively to hook 431 so that hook 431 comes into contact and rests on hook-retainer 291. In such a configuration, e.g. for moving beverage preparation machine 1, reservoir 4 is safely secured by being supported by docking station 3 and suspended via connecting hook arrangement 291,431 to beverage preparation module 2.

In a variation, instead of having a hook and hook-retainer fixedly associated with the reservoir and the housing of the beverage preparation module as illustrated in FIG. 5, it is possible to use an articulated hook arrangement that is configured to allow free movements of the beverage preparation module relative to the reservoir during use; and secure the reservoir to the beverage preparation module when the module is moved.

Typically, such connecting arrangements 291,431 are located in the upper half, upper third, upper quarter or even at the upper end, of reservoir 4 to ensure optimal stability of the reservoir 4 connected to the beverage preparation module 2.

The invention claimed is:

1. A beverage preparation machine comprising:
a beverage preparation module that vibrates during use; and
a reservoir for storing liquid and supplying the liquid to the beverage preparation module,
the beverage preparation module and the reservoir are connected by a vibration-barrier mechanical connection comprising (i) a resilient section and (ii) a counter-plug mounted in the resilient section, the resilient section configured for inhibiting or preventing propagation of vibrations from the beverage preparation module to the reservoir, and the reservoir having a foot that rests during use on an external support, the external support is unsecured to the beverage preparation module,
the vibration-barrier mechanical connection has a fluid circulation line extending from the beverage preparation module to the reservoir and comprising the resilient section,
the beverage preparation module has a fluid connector with a liquid inlet, and the reservoir has a fluid connector with a liquid outlet, the fluid connector of the beverage preparation module and the fluid connector of the reservoir being connectable to bring the reservoir in fluid communication with the beverage preparation module,
the fluid connector of the beverage preparation module forms a docking station for the reservoir, the liquid outlet of the reservoir comprises a plug comprising a seal urged against peripheral walls of the liquid outlet by a spring to block the liquid outlet, and mounting of the reservoir on the docking station comprises the counter-plug forcing the plug upwardly to space the seal from the peripheral walls to form a passage for liquid to flow from a bottom part of the reservoir through the liquid outlet into the liquid inlet.

2. The machine of claim 1, wherein the reservoir is disconnectable from the beverage preparation module at the resilient section.

3. The machine of claim 1, wherein the docking station supports the reservoir when the beverage preparation module is lifted or moved with the reservoir.

4. The machine of claim 1, wherein the fluid connector of the beverage preparation module contacts the reservoir via the resilient section.

5. The machine of claim 1, wherein the beverage preparation module has a bottom that is arranged to rest on the external support during use.

6. The machine of claim 5, wherein the bottom comprises one or more vibration-dampeners.

7. The machine of claim 6, wherein the vibration-dampeners comprise at least one component selected from the group consisting of rubber feet and rubber bumpers.

8. The machine of claim 1, comprising a connecting arrangement between the reservoir and the beverage preparation module for:
positioning the reservoir relatively to the beverage preparation module during use,
the connecting arrangement preventing or inhibit propagation of vibrations from the beverage preparation module to the reservoir during use.

9. The machine of claim 8, wherein the connecting arrangement comprises an arrangement articulated relative to at least one component selected from the group consisting of the reservoir and the beverage preparation module, and the arrangement is movable to prevent propagation of vibrations from the beverage preparation module to the reservoir.

10. The machine of claim 8, wherein the connecting arrangement comprises an arrangement fixed to at least one component selected from the group consisting of the reservoir and the beverage preparation module, and the arrangement is configured to:
allow free movements of the beverage preparation module relative to the reservoir during use; and
secure the reservoir to the beverage preparation module when the module is moved.

11. The machine of claim 1, wherein the beverage preparation module comprises an outermost housing, the reservoir being located adjacent the outermost housing.

12. The machine of claim 11, wherein the outermost housing and the reservoir have an interlocking arrangement for securing the reservoir to the housing when the beverage preparation module is displaced and allow free relative movements of the beverage module relative to the reservoir during use.

13. The machine of claim 1, wherein the beverage preparation module comprises a pump that vibrates during use to a beverage outlet of the beverage preparation module.

14. The machine of claim 1, which comprises a connecting arrangement between the reservoir and the beverage preparation module for:
positioning the reservoir in at least one configuration selected from the group consisting of (i) suspended from the beverage preparation module and (ii) secured to the beverage preparation module, when the module is lifted or moved, the connecting arrangement preventing or inhibit propagation of vibrations from the beverage preparation module to the reservoir during use.

15. The machine of claim 14, wherein the connecting arrangement comprises an arrangement articulated relative to at least one component selected from the group consisting of the reservoir and the beverage preparation module, and the connecting arrangement is movable to prevent propagation of vibrations from the beverage preparation module to the reservoir.

16. The machine of claim 14, wherein the connecting arrangement comprises an arrangement fixed to at least one component selected from the group consisting of the reservoir and the beverage preparation module, and the connecting arrangement is configured to:

allow free movements of the beverage preparation module relative to the reservoir during use; and secure the reservoir to the beverage preparation module when the module is moved.

\* \* \* \* \*